(12) United States Patent
Kang et al.

(10) Patent No.: US 8,909,567 B2
(45) Date of Patent: Dec. 9, 2014

(54) METHOD AND SYSTEM FOR THE DYNAMIC ALLOCATION OF RESOURCES BASED ON FAIRNESS, THROUGHPUT, AND USER BEHAVIOR MEASUREMENT

(75) Inventors: Dhanwant Singh Kang, Raleigh, NC (US); Hua Liu, Fairport, NY (US); Tong Sun, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 269 days.

(21) Appl. No.: 13/400,323

(22) Filed: Feb. 20, 2012

(65) Prior Publication Data

US 2013/0218814 A1     Aug. 22, 2013

(51) Int. Cl.
*G06N 5/00*     (2006.01)
*G06F 1/00*     (2006.01)

(52) U.S. Cl.
USPC .............................. 706/12; 455/522; 370/230

(58) Field of Classification Search
USPC .......................................................... 706/12
See application file for complete search history.

(56) References Cited

U.S. PATENT DOCUMENTS

| | | | |
|---|---|---|---|
| 6,625,709 B2 | 9/2003 | Aiken et al. | |
| 6,954,931 B2 | 10/2005 | Shetty et al. | |
| 6,957,113 B1 | 10/2005 | Logsdon et al. | |
| 7,230,991 B2 | 6/2007 | Sang et al. | |
| 2006/0026598 A1 | 2/2006 | Handlogten et al. | |
| 2007/0180134 A1* | 8/2007 | Steinbach et al. | 709/230 |
| 2009/0122700 A1* | 5/2009 | Aboba et al. | 370/230 |
| 2010/0082513 A1* | 4/2010 | Liu | 706/46 |

OTHER PUBLICATIONS

Carmel, D. et al., "Exploration Strategies for Model-based Learning in Multi-agent Systems," *Autonomous Agents and Multi-agent Systems* (1999) 2:141-172.
Hang, C.-W. et al, "From Quality to Utility:Adaptive Service Selection Framework," Proceedings of the 8th International Conference on Service Oriented Computing (ICSOC) Dec. 2010, pp. 456-470.
Jain, R. K. et al., "A Quantitative Measure of Fairness and Discrimination for Resource Allocation in Shared Computer System," DEC Research Report TR-301 Sep. 26, 1984, 38 pages.
Mailler, R. et al., "Cooperative Negotiation for Soft Real-Time Distributed Resource Allocation," *AAMAS* Jul. 14-18, 2003, Melbourne, Australia, 8 pages.
Shafique, M. et al., "Minority-Game-based Resource Allocation for Run-Time Reconfigurable Multi-Core Processors," *Design, Automation & Test in Europe Conference & Exhibition* Mar. 14-18, 2011, Grenoble, 6 pages.

* cited by examiner

*Primary Examiner* — Jeffrey A. Gaffin
*Assistant Examiner* — Kalpana Bharadwaj
(74) *Attorney, Agent, or Firm* — Kermit D. Lopez; Luis M. Ortiz; Ortiz & Lopez, PLLC (57) ABSTRACT

A system and method for the dynamic allocation of resources based on fairness, throughput, and user behavior measurement. A resource allocation decision can be made based on an index value computed by a selection index function. A fairness coefficient and a throughput coefficient, which represent the significance of fairness and throughput can be computed utilizing a reinforcement learning algorithm. The degree of fairness and throughput coefficient can be varied while allocating resources. A user behavior coefficient with respect to a user can be computed to determine the degree of cooperativeness of the user with other users and the value of user behavior coefficient can be updated each time it interacts with the system.

17 Claims, 8 Drawing Sheets

METHOD AND SYSTEM FOR THE DYNAMIC ALLOCATION OF RESOURCES BASED ON FAIRNESS, THROUGHPUT, AND USER BEHAVIOR MEASUREMENT

TECHNICAL FIELD

Embodiments are generally related to process management systems and methods. Embodiments are also related to resource allocation systems and methods. Embodiments are additionally related to the measurement of system fairness, throughput, and user behavior.

BACKGROUND OF THE INVENTION

Project management involves the planning, organizing, securing, and managing of resources in order to successfully complete specific project goals and objectives. In project management, resource allocation typically includes the scheduling of activities and the resources required by such activities while taking into consideration both the resource availability and the project time. Resource allocation provides a large number of algorithmic solutions to allocation problems. The demand patterns, however, may undergo permanent or seasonal variations in demand during the life cycle of a process, due to changes in, for example, customer and user requirements. Additionally, there can also be changes in the execution speed of particular processes as process operators become more proficient at their tasks or begin performing new types of tasks. As a consequence, the process moves into a state of sub-optimal performance. Such changes can render the initial resource allocation sub-optimal, which will result in below-par performance of the processes. The actual number of resources required may be higher or lower than the initially allocated number.

Conventional models for allocating resources includes, for example, an even resource distribution, a highest priority first, a shortest job first, and first come first serve. Such resource allocation models either focus on a system fairness or system throughput measurement. The fairness measure (fairness index) is calculated utilizing Jain's fairness index and max-min ratio. The Jain's fairness index is only efficient for a homogenous user demand (i.e., user having similar demand and equal priority. The max-min ratio mechanism does not lead to precise evaluation of the fairness measure because it considers only the maximum and minimum allocations while computing the fairness measure.

For example, the even resource distribution approach is only efficient for scenarios where the users' demand is homogenous thus allocating the resources evenly provides a fair solution. The fairness measure of the even resource distribution allocation can be computed utilizing the Jain's fairness index as indicated in equation (1) as follows:

$$f(x) = \frac{\left[\sum_{i=1}^{n} x_i\right]^2}{\sum_{i=1}^{n} x_i^2} \quad (1)$$

According to the definition of the Jain's fairness index $f(x) \in [0,1]$, where value of 0 implies least fair and value of 1 implies maximum fair. Such fairness model can be applied to user having similar demand and doesn't yield high system throughput. The highest priority first approach offers a high throughput solution however it is not fair in cases where $R \ll D$ where R represents total available resources and D is the total demand of all the users. Similarly, the shortest job first approach and the first come first serve algorithm offers partially efficient solutions which are either fair or yield high throughput.

Based on the foregoing, it is believed that a need exists for an improved system and method for dynamically allocating resources based on system fairness, throughput and user behavior measurement, as will be described in greater detail herein.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved process management system and method.

It is another aspect of the disclosed embodiments to provide for an improved system and method for dynamically allocating resources based on fairness, throughput, and user behavior measurement.

It is a further aspect of the disclosed embodiments to provide for an improved system and method for determining fairness, throughput, and user behavior.

The aforementioned aspects and other objectives and advantages can now be achieved as described herein. A system and method for the dynamic allocation of resources based on fairness, throughput, and user behavior measurement is disclosed herein. A resource allocation decision can be made based on an index value computed by a selection index function. A fairness coefficient and a throughput coefficient, which represents the significance of fairness and throughput can be estimated utilizing a reinforcement learning algorithm (e.g., Boltzmann exploration) and the degree of fairness and throughput coefficient can be varied while allocating resources. The reinforcement learning algorithm implements exploration and exploitation as a function of a temperature Parameter to determine an optimal value of the fairness and throughput coefficient for successive iterations utilizing a probability function based on the selection index and the temperature parameter. A user behavior coefficient with respect to a user can be computed to determine the degree of cooperativeness of the user with other users and the value of user behavior coefficient can be updated each time it interacts with the system. Such resource allocation approach provides a Pareto optimal solution without implementing market mechanisms and leads to high user satisfaction and retention rates.

The fairness measurement can be applied to heterogeneous user demands. The percentage of the fairness and throughput can be controlled by the fairness and throughput coefficients respectively. The temperature parameter can be adjusted in accordance with an environment setting. For example, if the environment is static (i.e., interacting with same users), then the value of temperature parameter is reduced with time and if the environment is dynamic (i.e., number of new users are non-decreasing), then the temperature parameter is kept constant or increased with time. The low temperature leads to higher exploitation (lower exploration) and high temperature leads to lower exploitation (higher exploration). When the value of temperature parameter is high, then the probability value is approximately similar and the selection decision can be randomly made so that a solution space is explored at higher temperature parameter values. When the value of temperature parameter is low, the decisions can be made utilizing a greedy approach.

The user behavior can be considered as a parameter for allocating the resource by iteratively interacting with the user in order to motivate the user to be more cooperative. The negotiation process starts with setting value of a reduction factor. The maximum users with highest selection index values and demand less than total availability can be selected. The user with a low value of behavior coefficient is considered as a greedy user and the user with a high value is considered as a cooperative user. The greedy user tends to be less flexible in the negotiation process, while the cooperative user is more flexible in the negotiation process. As a result, the cooperative user leads to a more efficient resource allocation process and in order to motivate the users to be more cooperative the behavior coefficient value is assigned to each user depending on the behavior. The users with the higher values of behavior coefficient possess higher probability of selection in future interactions as compared to the user with the lower values of behavior coefficient.

The resource allocation system provides an efficient solution to maximize the throughput and introduces the notion of fairness by allowing the fair resource allocation for heterogeneous user demands. The resource allocation model offers an efficient and generic solution to the allocation problems where resource availability is less than total demand. A weight age for the fairness and throughput is specified based on a business requirement and the system can learn adaptively to determine an optimal value for the fairness weight age and the throughput weight age utilizing the reinforcement learning algorithm. The resource allocation system can be implemented by a virtual broker in an ACS marketplace.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the present invention can be embodied as a method, data processing system, or computer program product. Accordingly, the present invention may take the form of an entire hardware embodiment, an entire software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, USB flash drives, DVDs, CD-ROMs, optical storage devices, magnetic storage devices, etc.

Computer program code for carrying out operations of the present invention may be written in an object oriented programming language (e.g., java, C++, etc.). The computer program code, however, for carrying out operations of the present invention may also be written in conventional procedural programming languages such as the "C" programming language or in a visually oriented programming environment such as, for example, Visual Basic.

The program code may execute entirely on the user's computer, partly on the user's computer, as a stand-alone software package, partly on the user's computer and partly on a remote computer or entirely on the remote computer. In the latter scenario, the remote computer may be connected to a user's computer through a local area network (LAN) or a wide area network (WAN), wireless data network e.g., WiFi, WiMax, 802.11x, and cellular network or the connection can be made to an external computer via most third party supported networks (e.g. through the Internet via an internet service provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 1:
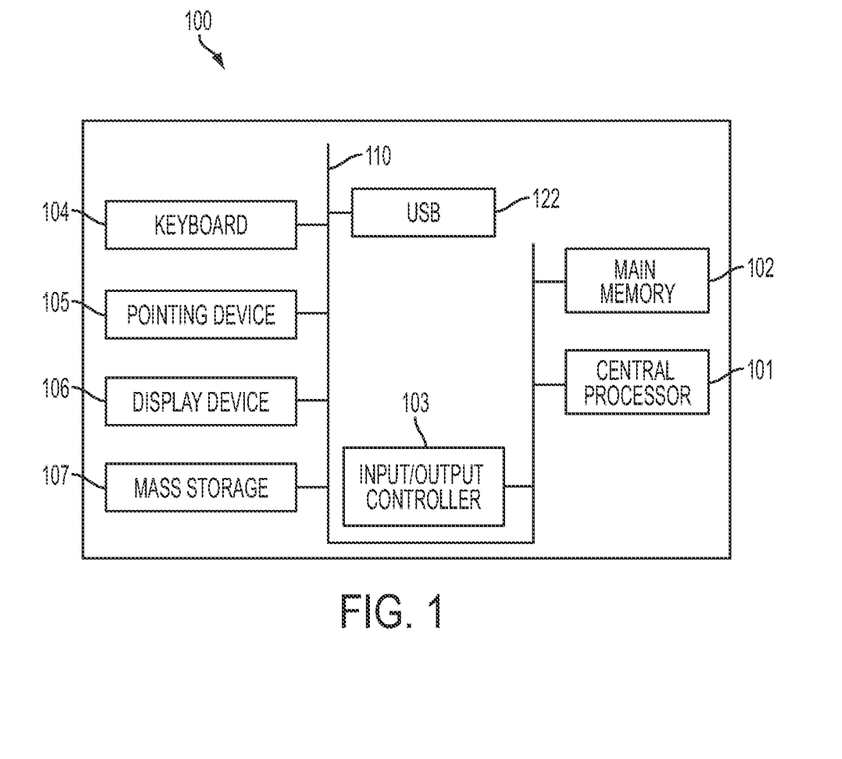
FIG. 1 illustrates a schematic view of a computer system, in accordance with the disclosed embodiments.
Figure 2:
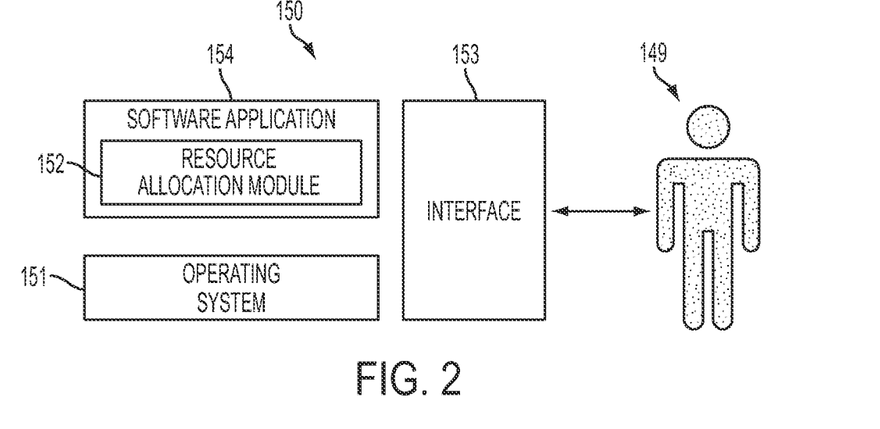
FIG. 2 illustrates a schematic view of a software system including a dynamic resource allocation module, an operating system, and a user interface, in accordance with the disclosed embodiments.

FIGS. 1-2 are provided as exemplary diagrams of data-processing environments in which embodiments of the present invention may be implemented. It should be appreciated that FIGS. 1-2 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 1, the disclosed embodiments may be implemented in the context of a data-processing system 100 that includes, for example, a central processor 101, a main memory 102, an input/output controller 103, a keyboard 104, an input device 105 (e.g., a pointing device such as a mouse, track ball, pen device, etc.), a display device 106, a mass storage 107 (e.g., a hard disk), and a USB (universal serial bus) peripheral connection 122. As illustrated, the various components of data-processing system 100 can communicate electronically through a system bus 110 or similar architecture. The system bus 110 may be, for example, a subsystem that transfers data between, for example, computer components within data-processing system 100 or to and from other data-processing devices, components, computers, etc.

FIG. 2 illustrates a computer software system 150 for directing the operation of the data-processing system 100 depicted in FIG. 1. Software application 154, stored in main memory 102 and on mass storage 107, generally includes a kernel or operating system 151 and a shell or interface 153. One or more application programs, such as software application 154, may be "loaded" (i.e., transferred from mass storage 107 into the main memory 102) for execution by the data-processing system 100. The data-processing system 100 receives user commands and data through user interface 153; these inputs may then be acted upon by the data-processing system 100 in accordance with instructions from operating system module 151 and/or software application 154.

The following discussion is intended to provide a brief, general description of suitable computing environments in which the system and method may be implemented. Although not required, the disclosed embodiments will be described in the general context of computer-executable instructions such as program modules being executed by a single computer. In most instances, a "module" constitutes a software application.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked personal computers, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application such as a computer program designed to assist in the performance of a specific task such as word processing, accounting, inventory management, etc.

The interface 153, which is preferably a graphical user interface (GUI), can serve to display results, whereupon a user may supply additional inputs or terminate a particular session. In some embodiments, operating system 151 and interface 153 can be implemented in the context of a "windows" system. It can be appreciated, of course, that other types of systems are possible. For example, rather than a traditional "windows" system, other operation systems such as, for example, a real time operating system (RTOS) more commonly employed in wireless systems may also be employed with respect to operating system 151 and interface 153. The software application 154 can include, for example, a dynamic resource allocation module 152 to constantly adjust the resource allocation based on fairness, throughput, and user behavior. The dynamic resource allocation module 152 can include instructions such as those of method 400 discussed herein with respect to FIG. 4.

FIGS. 1-2 are thus intended as examples and not as architectural limitations of disclosed embodiments. Additionally, such embodiments are not limited to any particular application or computing or data-processing environment. Instead, those skilled in the art will appreciate that the disclosed approach may be advantageously applied to a variety of systems and application software. Moreover, the disclosed embodiments can be embodied on a variety of different computing platforms including Macintosh, Unix, Linux, and the like.

Figure 3:
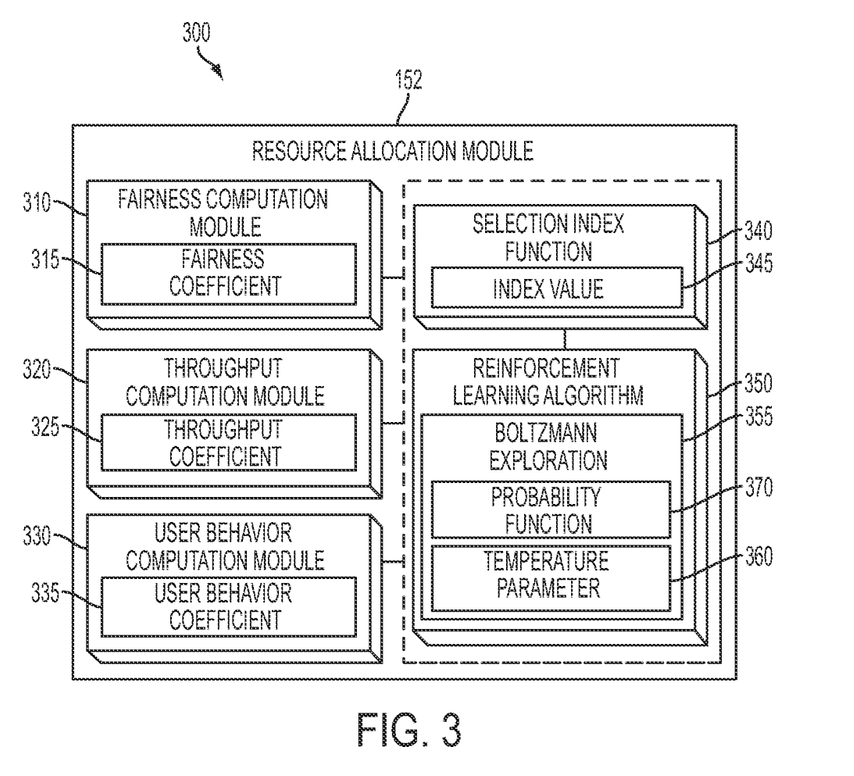
FIG. 3 illustrates a block diagram of a dynamic resource allocation system, in accordance with the disclosed embodiments.

FIG. 3 illustrates a block diagram of a dynamic resource allocation system 300, in accordance with the disclosed embodiments. Note that in FIGS. 1-8, identical or similar blocks are generally indicated by identical reference numerals. The dynamic resource allocation system 300 can be configured to include the dynamic resource allocation module 152 to constantly adjust the resource allocation based on fairness, throughput, and user behavior measurement. The dynamic resource allocation module 152 further includes a fairness computation module 310, a throughput computation module 320, and a user behavior computation module 330. The fairness computation module 310 can be employed to determine whether a user and/or an application is receiving a fair share of a system resource. The fairness computation module 310 can be applied to a heterogeneous user demand.

A selection index function 340 computes an index value 345 in order to make a resource allocation decision. A fairness coefficient 315 and a throughput coefficient 325, which represents the significance of fairness and throughput, can be computed utilizing a reinforcement learning algorithm 350. The reinforcement learning algorithm 350 provides optimal decision-making choices under uncertain conditions. The reinforcement-learning map business process situations to business process actions so as to, for example, maximize a numerical reward signal related to an explicit goal. The reinforcement learning algorithm 350 can be, for example, Boltzmann exploration 355, depending upon design considerations. In general, Boltzmann exploration 355 is a utility-based strategy that reduces the tendency for exploration with time. It is based on the assumption that the current model improves as learning progresses. Boltzmann exploration 355 assigns a positive probability to any possible action according to its expected utility and according to the temperature parameter.

The degree of fairness and throughput coefficient 315 and 325 can be varied while allocating resources. The reinforcement learning algorithm 350 implements exploration and exploitation as a function of temperature parameter 360 to determine an optimal value of the fairness and throughput coefficient 315 and 325 for successive iterations utilizing a probability function 370 based on the selection index 340 and the temperature parameter 360. A user behavior coefficient 330 with respect to a user can be computed to determine the degree of cooperativeness of the user with other users. The value of user behavior coefficient 330 can be updated each time it interacts with the system 300. The resource allocation system 300 provides a Pareto optimal solution without implementing market mechanisms and leads to high user satisfaction and retention rates.

Figure 4:
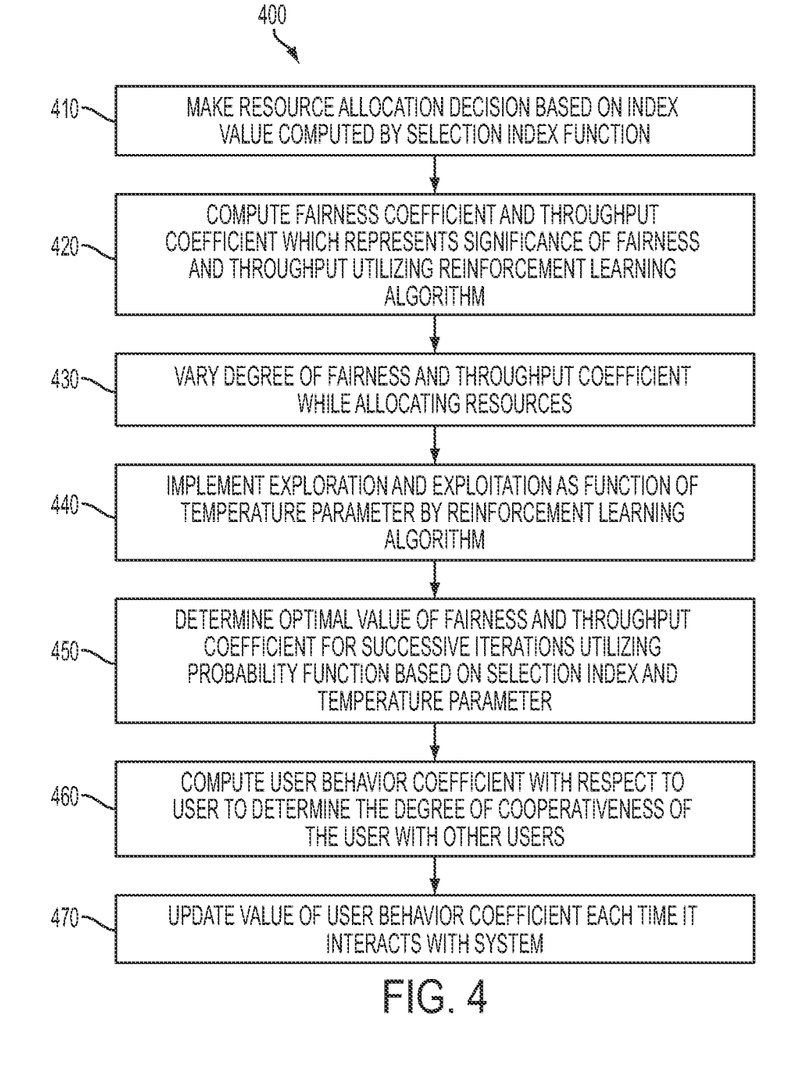
FIG. 4 illustrates a high level flow chart of operations illustrating logical operational steps of a method for dynamically allocating resources based on fairness, throughput, and user behavior, in accordance with the disclosed embodiments.

FIG. 4 illustrates a high level flow chart of operation illustrating logical operational steps of a method 400 for dynamically allocating resources based on fairness, throughput, and user behavior, in accordance with the disclosed embodiments. Initially, the resource allocation decision can be made based on the index value 345 computed by the selection index function 340, as depicted at block 410.

For example, consider n users that are represented as $(U_1, U_2 \ldots, U_x \ldots, U_n)$ and their corresponding demands at each time step are represented as $((d_1, d_2 \ldots, d_x \ldots, d_n)^1, (d_1, d_2 \ldots, d_x \ldots, d_n)^2, \ldots, (d_1, d_2 \ldots, d_x \ldots, d_n)^T)$, where t represents the total number of time steps. The resource allocation decisions can be made by the system 300 based on the index values 345 computed by the selection index function 340 as shown in equation (2) below:

$$SI^i(x) = \frac{\alpha_f^i\left(1 - \frac{w_x}{t}\right) + \alpha_t^{1-i}\left(1 - \frac{d_x}{d_{max}}\right) + \beta_x^{t-1}}{2} \quad (2)$$

In equation (2) above, the term $$\left(1 - \frac{w_x}{t}\right)$$

introduces the notion of "fairness," which restricts the system 300 from allocating resources to the same user repetitively. In the same equation(2) above, the term $$\left(1 - \frac{d_x}{d_{max}}\right)$$

introduces the notion of (high) system throughput. Definitions of parameters and symbols utilized in equation (1) and herein are illustrated in Table 1 below.

TABLE 1

| Symbol | Definition |
| --- | --- |
| $\alpha_f$ | Fairness coefficient, $\alpha_f \in [0, 1]$ |
| $\alpha_t$ | Throughput coefficient, $\alpha_t \in [0, 1]$ |
| $\beta_x^{t-1}$ | Average behavior coefficient value for $U_x$, at $(t-1)^{th}$ trial |
| $w_x$ | Number of times $U_x$ has won in past |
| t | Current trial number, $t \in T$ |
| T | Total number of trials |
| $d_x$ | Demand of $U_x$ |
| $d_{max}$ | Maximum demand of user $U_i \in U$, max $\{d_1, d_2 \ldots, d_i \ldots, d_n\}$ |

The fairness coefficient and the throughput coefficient 315 and 325, which respectively represent the significance of fairness and throughput, can be computed utilizing the reinforcement learning algorithm 350 (e.g., Boltzmann exploration), as indicated at block 420. The degree of fairness and throughput coefficient 315 and 325 can be varied while allocating resources, as illustrated at block 430. The percentage of fairness and throughput can be controlled by fairness ($\alpha_f$) and throughput ($\alpha_t$) coefficients 315 and 325 respectively. The optimal values of the fairness coefficient ($\alpha_f$) and throughput coefficient ($\alpha_t$) can be determined by the reinforcement learning algorithm 350. The Boltzmann exploration can be utilized as a learning mechanism, which implements exploration and exploitation as a function of temperature parameter $T_{exp}$ in order to address the tradeoff between exploitation and exploration and to avoid sub optimal solution by making selection decisions based on exploitation and to avoid high computational complexity by making all decisions using exploration.

The Boltzmann exploration can determine the optimal values of fairness and throughput coefficients 315 and 325 for successive iterations using the probability function 370, which calculates the probabilities based on selection index and $T_{exp}$, as depicted at block 440. As a part of the learning process, the fairness and throughput coefficients pair ($\alpha_f, \alpha_t$) can be defined with values $\{(\alpha_f^0, \alpha_t^1), \ldots (\alpha_f^i, \alpha_t^{1-i}), \ldots, (\alpha_f^1, \alpha_t^0)\}$ and the corresponding selection index values can be defined as illustrated below in equation (3):

$$\{<SI^1(1), SI^1(2), \ldots SI^1(i), \ldots, SI^1(n)>, \ldots <SI^i(1), SI^i(2), \ldots SI^i(i), \ldots SI^i(n)>, \ldots <SI^N(1), SI^N(2), \ldots SI^N(i), \ldots SI^N(n)>\} \quad 3)$$

wherein n represents the total number of possible ($\alpha_f, \alpha_t$) pairs in the solution space and $SI^i(x)$ represents the selection index value of $U_x$ with fairness coefficient value $\alpha_f^i$, and throughput coefficient value $\alpha_t^{1-i}$. A coefficient value pair of $<\alpha_f^0, \alpha_t^1>$ implies the values of fairness and throughput coefficients are 0 and 1 respectively. The Boltzmann exploration mechanism 355 chooses optimal $<\alpha_f^i, \alpha_t^{1-i}>$ pair using the following equation (4):

$$P(\alpha_f^i) = \frac{e^{\sum_{j=1}^{n} SI^i(j)/(n*T_{exp})}}{\sum_{k=1}^{N} e^{\sum_{j=1}^{n} SI^k(j)/(n*T_{exp})}}. \quad (4)$$

The value of the above function depends on temperature parameter ($T_{exp}$), which can be adjusted according to the environment setting. If the environment is static (i.e., interacting with same users), then the value of $T_{exp}$ is reduced with time. If the environment is dynamic (i.e., number of new users are non-decreasing), $T_{exp}$ is kept constant or increased with time. Low temperature leads to higher exploitation (lower exploration) and high temperature leads to lower exploitation (higher exploration). When the value of $T_{exp}$ is high, then probability values computed by equation (4) are approximately similar and the selection decision is made random so that the solution space is explored at higher $T_{exp}$ values.

The decisions can be made using greedy approach at lower $T_{exp}$ by selecting the $(\alpha_f, \alpha_t)$ pair that yields highest selection index value. The user behavior coefficient 335 with respect to a user can be computed to determine the degree of cooperativeness of the user with other users, as depicted at block 460. The value of user behavior coefficient 335 can be updated each time it interacts with the system 300, as illustrated at block 470. The computation of user behavior coefficient 335 is an iterative negotiation process that leads to the user behavior analysis.

Initially, the maximum users with highest selection index values 345 and demand less than total availability can be selected. The selection index 340 and user demand pair i.e., $(SI(x),d_x)$, can be considered where $SI(x)$ represents selection index value, $d_x$ represents actual demand, and $d_x^i$ represents the demand at the end of $i_{th}$ iteration for $U_x$. In $i^{th}$ iteration, $\{m:m\leq n\}$ is maximized by selecting the users with highest selection index values 345, arranged in descending sorted order of selection index values in $[(SI(1),d_1), (SI(2),d_2) \ldots, (SI(x),d_x) \ldots, (SI(n),d_n)]^t$ subject to $\Sigma_{j=1}^{m} d_j \leq R$, where R represents total available resources.

The negotiation process starts with setting the value of $\gamma$ i.e., reduction factor. The initial demand of m users selected in the selection process is assumed as $\{d_1, d_2 \ldots, d_x \ldots, d_m,\}$, then the resources offered to the users in first iteration are $$\left\{ \frac{\gamma*d_1}{100}, \frac{\gamma*d_2}{100} \ldots, \frac{\gamma*d_x}{100} \ldots, \frac{\gamma*d_m}{100} \right\}$$

respectively. The user demand at the end of $1^{st}$ iteration is assumed as $\{d'_1, d'_2, \ldots, d'_x \ldots, d'_m,\}$. So, the total new user demand at the end of $1^{st}$ iteration of negotiation process is $\Sigma_{j=1}^{m} d'_j$ i.e., D', so available resources are $(R-D')=\delta$. If $\delta > 0$, the selection process is performed to select the next set users to be considered for negotiation and this process continuous iteratively till $\delta=0$. The value of behavior coefficient for $U_x$ in $t^{th}$ trial is calculated as shown below in equation (5):

$$\beta_x^t = \frac{d_x - d'_x}{d_x(1 - \frac{\gamma}{100})} \quad (5)$$

Term $\beta_x^t$ represents the user behavior coefficient value for $U_x$ at $t^{th}$ trial, which is employed for calculating average value of behavior coefficient for $U_x$ at $t^{th}$ trial i.e., $$\beta_x^t = \frac{\sum_{j=1}^{t} \beta_x^j}{t}$$

and it is employed for calculating the selection index value for $U_x$ at $(t+1)^{th}$ trial. The value of the user behavior coefficient 335 for $1^{st}$ trial is 0 i.e., $\beta_x^0=0 \forall x \in n$, because system 300 doesn't have any knowledge of the user behavior initially. The users with low values of the behavior coefficient 335 are considered as greedy users and those with high values are considered as cooperative users.

The greedy users tend to be less flexible in the negotiation process, while cooperative users are more flexible in the negotiation process. As a result, the cooperative users lead to a more efficient resource allocation process and in order to motivate the users to be more cooperative, the behavior-coefficient value is assigned to each user depending on the user behavior. The users with higher values of behavior coefficient 335 (i.e., cooperative users) will have higher probability of selection in future interactions, as compared to users with lower values of behavior coefficient 335 (i.e., greedy users).

Figure 5:
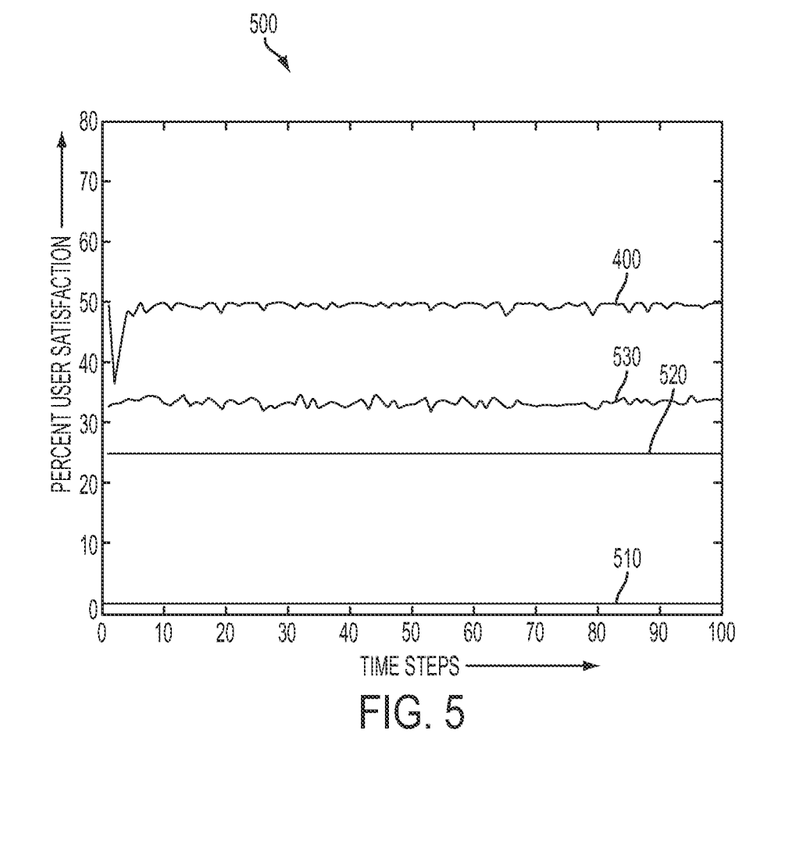
FIGS. 5-6 illustrate a graph depicting data indicative of a percentage of satisfied users, in accordance with the disclosed embodiments.
Figure 6:
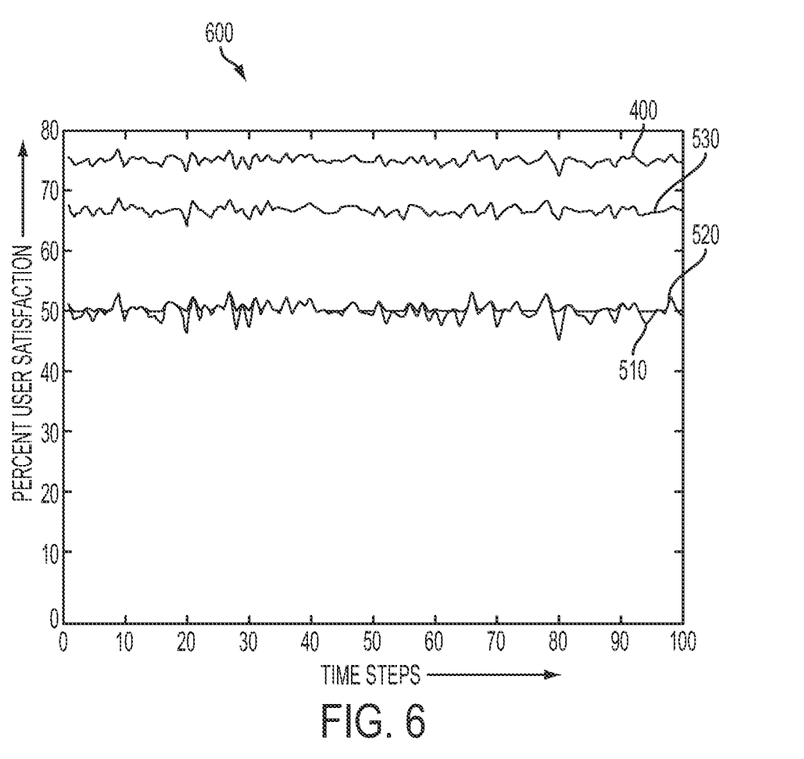

FIGS. 5-6 illustrate respective graphs 500 and 600, which depict data indicative of a percentage of satisfied users, in accordance with the disclosed embodiments. The user satisfaction and user waiting time with respect to the allocation method 400 can be compared with different allocation approaches, for example, even distribution 510, highest priority first 520, and first come first serve 530. The user satisfaction rate is directly proportional to throughput of an algorithm as higher is the number of satisfied users more is the retention rate. As the user waiting time is inversely proportional to the fairness of an algorithm the lower is the waiting time for the user (for getting a resource) the more is the fairness. The test case scenarios for analyzing user satisfaction rate and user waiting time in different resource allocation algorithms are illustrated in Table 2 below:

TABLE 2

| Test Case | # Resources | # Users | Min. Demand/User | Max. Demand/User | # Trials |
|---|---|---|---|---|---|
| Case 1 | 500 | 1000 | 1 | 2 | 100 |
| Case 2 | 1000 | 1000 | 1 | 2 | 100 |

The graph 500 illustrates the user satisfaction rates for case 1, in successive iterations. The user demand in this case is always more than the resource availability, so the user satisfaction rates in the even distribution algorithm is zero. The graph 600 illustrates the satisfaction rates for case 2, the user satisfaction rate is more than the previous case because the maximum demand of a single user can be 2 and total resource availability is 1000, hence on an average the user demand is 1.5 which means approximately 50% of users can be satisfied by the algorithm 350. Table 3 below illustrates example average statistics for user satisfaction rate in test scenarios.

TABLE 3

| Algorithm | Avg. Satisfied | Avg. Dissatisfied Case 1 | % Satisfied | Avg. Satisfied | Avg. Dissatisfied Case 2 | % Satisfied |
|---|---|---|---|---|---|---|
| Even Distribution | 0 | 1000 | 0% | 499.42 | 500.58 | 49.94% |
| First Come First Serve | 333.21 | 667.79 | 33.32% | 667.79 | 333.21 | 66.68% |
| Highest Priority First | 250 | 750 | 25% | 494.34 | 505.66 | 50.57% |
| Our Proposed Method | 493.56 | 506.44 | 49.36% | 749.46 | 250.54 | 74.95% |

The analysis of the satisfaction rates on the basis of the above statistics implies that the resource allocation method 400 in both test case scenarios has more percentages of satisfied users compared to other approaches 510, 520, and 530.

Figure 7:
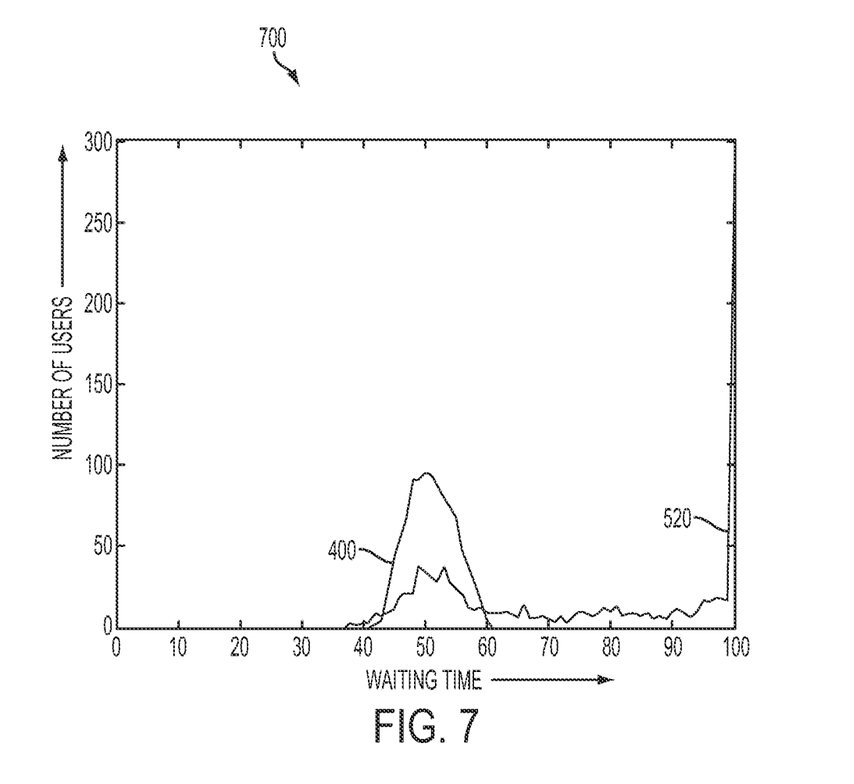
FIGS. 7-8 illustrate a graph depicting data indicative of user waiting time, in accordance with the disclosed embodiments.
Figure 8:
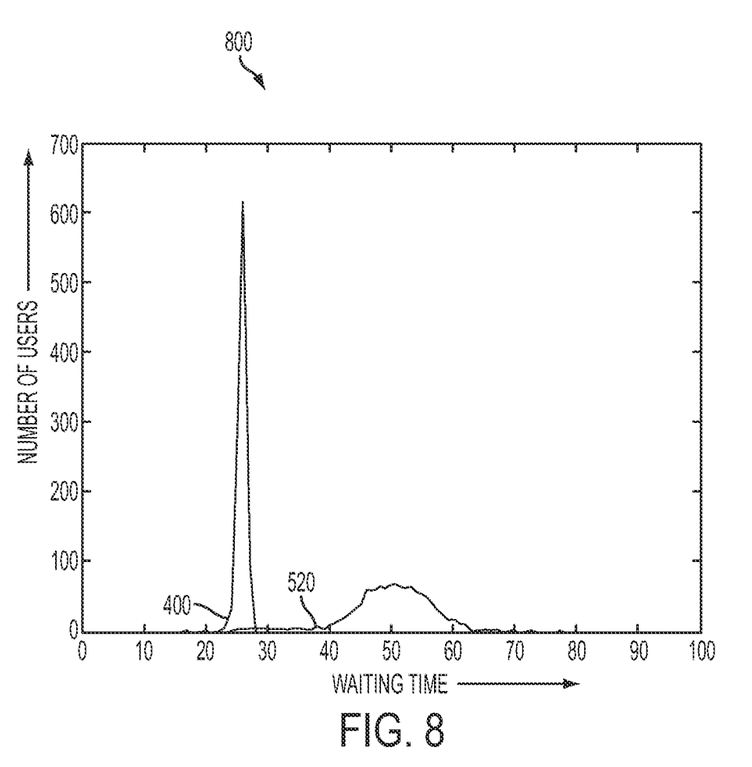

FIGS. 7-8 respectively illustrate graphs 700 and 800, which depict data indicative of a user waiting time, in accordance with the disclosed embodiments. The fairness component of the resource allocation method 400 i.e.

$$\left(1 - \frac{w_x}{t}\right)$$

accounts for higher user satisfaction rate and at the same time throughput component balances it depending on the value of throughput coefficient, thus achieving optimal fairness and throughput in the resource allocation. Table 4 and Table 5 correspond to test case 1 and 2 respectively, which illustrate the waiting time for a user before the user obtains a resource.

TABLE 4

| Algorithm | Min Wait Time | Max Wait Time | Avg. Wait Time | Std. Dev. Wait Time |
|---|---|---|---|---|
| Even Distribution | 99 | 99 | 99 | 0 |
| FCFS | 0 | 99 | 64.62 | 47 |
| HPF | 0 | 99 | 31.21 | 43.05 |
| Our Proposed Method | 0 | 13 | 1.01 | 0.16 |

TABLE 5

| Algorithm | Min Wait Time | Max Wait Time | Avg. Wait Time | Std. Dev. Wait Time |
|---|---|---|---|---|
| Even Distribution | 0 | 17 | 1 | 0.21 |
| FCFS | 0 | 99 | 30.68 | 45.42 |
| HPF | 0 | 14 | 0.99 | 0.3 |
| Our Proposed Method | 0 | 4 | 0.33 | 0.01 |

The users' waiting time in case of the resource allocation method 400 is much less than the even distribution 510, highest priority first 520, and first come first serve 530. The user's waiting time for the allocation method 400 and the highest priority first 520 is compared and the results are shown in FIGS. 7-8. The total waiting time for users is more concentrated in the allocation method 400 as compared to the highest priority first 520. This observation signifies that deviation between the users' waiting time in case of the resource allocation method 400 is lesser than traditional resource allocation method 520. In FIG. 7, the waiting time for the highest priority first algorithm 520 is distributed between 24 time units and 77 time units i.e. maximum difference between waiting times is 53. However, for the resource allocation method 400 deviations is only 4 time units which lead to higher degree of user satisfaction and guarantees envy free allocation.

The user can vary the number of users, number of resources, and number of iterations, run algorithms and compare results. The resource allocation system 300 provides an efficient solution to maximize the throughput and introduces the notion of fairness by allowing the fair resource allocation for heterogeneous user demands. The resource allocation model offers an efficient and generic solution to allocation problems where resource availability is less than total demand and the degree of fairness and throughput varies while allocating the resources. A weight age for the fairness and throughput is specified based on the business requirements and the system 300 can learn adaptively to determine an optimal value for the fairness weight age and the throughput weight age using the reinforcement learning algorithm 350. The resource allocation system 300 can be implemented by, for example, a "virtual" broker in an electronic (e.g., Internet or other) marketplace.

Based on the foregoing, it can be appreciated that embodiments, preferred and alternative, are disclosed herein. For example, in one embodiment, a method for dynamically allocating resources in a process can be implemented. Such a method can include, for example, estimating a fairness coefficient and a throughput coefficient that represents significance of a fairness and a throughput utilizing a reinforcement learning algorithm in order to thereafter vary a degree of the fairness coefficient and the throughput coefficient while allocating a resource, and computing a user behavior coefficient with respect to a user to determine a degree of cooperativeness of the user with a plurality of other users and updating the user behavior coefficient thereof in order to dynamically allocate the resource in a process with a high user satisfaction and a retention rate. In another embodiment, an operation or step can be provided for rendering a resource allocation decision based on an index value computed by a selection index function.

In another embodiment, operations or steps can be provided for implementing an exploration and exploitation as a function of a temperature parameter by the reinforcement learning algorithm, and determining an optimal value of the fairness coefficient and the throughput coefficient for successive iterations utilizing a probability function based on a selection index and the temperature parameter. In yet another embodiment, an operation or step can be provided for applying the fairness measurement based on a heterogeneous user demand. In still another embodiment, an operation or step can be implemented for adjusting the temperature parameter in accordance with an environment setting wherein a low temperature leads to a higher exploitation and a lower exploration and a high temperature leads to a lower exploitation and a higher exploration.

In still other embodiments, operations or steps can be provided for randomly rendering a selection decision when the temperature parameter value is high so that a solution space is explored at the higher temperature parameter value, and rendering a selection decision utilizing a greedy approach when the temperature parameter value is low. In yet other embodiments, an operation or step can be provided for considering the user behavior coefficient as a parameter for the resource allocation by iteratively interacting with the user in order to motivate the user to be more cooperative (e.g., among users). In yet another embodiment, operations or steps can be implemented for initiating a negotiation process by designating a value of a reduction factor in order to thereafter select a maximum number of users with a highest selection index value and a demand less than a total availability, and considering a user with a low value of the user behavior coefficient as a greedy user that tends to be less flexible in the negotiation process and a user with a high value as a "cooperative" user who is more flexible in the negotiation process.

In another embodiment, an operation or step can be implemented for assigning the user behavior coefficient value to each user depending on the behavior in order to motivate the user to be more cooperative for efficiently allocating the resource. In yet other embodiments, the "cooperative" user may possess a higher probability of selection in a future interaction as compared to the "greedy" user. In still another embodiment, an operation or step can be provided for specifying a weight age for the fairness and the throughput based on a business requirement in order to thereafter determine an optimal value for the fairness weight age and the throughput weight age utilizing the reinforcement learning algorithm.

In another embodiment, a system can be implemented for dynamically allocating resources in a process. Such a system can include, for example, a processor, a data bus coupled to the processor, and a computer-usable medium embodying computer code, the computer-usable medium being coupled to the data bus. Such computer program code can include, for example, instructions executable by the processor and configured for estimating a fairness coefficient and a throughput coefficient that represents significance of a fairness and a throughput utilizing a reinforcement learning algorithm in order to thereafter vary a degree of the fairness coefficient and the throughput coefficient while allocating a resource; and computing a user behavior coefficient with respect to a user to determine a degree of cooperativeness of the user with a plurality of other users and updating the user behavior coefficient thereof in order to dynamically allocate the resource in a process with a high user satisfaction and a retention rate.

In another embodiment, such instructions can be further configured for rendering a resource allocation decision based on an index value computed by a selection index function. In yet another embodiment, such instructions can be further configured for implementing an exploration and exploitation as a function of a temperature parameter by the reinforcement learning algorithm; and determining an optimal value of the fairness coefficient and the throughput coefficient for successive iterations utilizing a probability function based on a selection index and the temperature parameter. In yet other embodiments, such instructions can be further configured for applying the fairness measurement based on a heterogeneous user demand.

In other embodiments, such instructions can be further configured for adjusting the temperature parameter in accordance with an environment setting wherein a low temperature leads to a higher exploitation and a lower exploration, and a high temperature leads to a lower exploitation and a higher exploration. In yet other embodiments, such instructions can be further configured for randomly rendering a selection decision when the temperature parameter value is high so that a solution space is explored at the higher temperature parameter value; and rendering a selection decision utilizing a greedy approach when the temperature parameter value is low.

In still another embodiment, a processor-readable medium can be provided for storing code representing instructions to cause a process to perform a process to dynamically allocate resources in a process. Such code may include code to, for example, estimate a fairness coefficient and a throughput coefficient that represents significance of a fairness and a throughput utilizing a reinforcement learning algorithm in order to thereafter vary a degree of the fairness coefficient and the throughput coefficient while allocating a resource; and compute a user behavior coefficient with respect to a user to determine a degree of cooperativeness of the user with a plurality of other users and updating the user behavior coefficient thereof in order to dynamically allocate the resource in a process with a high user satisfaction and a retention rate.

In another embodiment, such code can include code to, for example, render a resource allocation decision based on an index value computed by a selection index function. In yet other embodiments, such code may include code to, for example, implement an exploration and exploitation as a function of a temperature parameter by the reinforcement learning algorithm; and determine an optimal value of the fairness coefficient and the throughput coefficient for successive iterations utilizing a probability function based on a selection index and the temperature parameter.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for dynamically allocating resources in a process, said method comprising:
   estimating a fairness coefficient and a throughput coefficient that respectively represent a significance of a fairness and a throughput utilizing a reinforcement learning algorithm in order to thereafter vary a degree of said fairness coefficient and said throughput coefficient while allocating a resource;
   computing a user behavior coefficient with respect to a user to determine a degree of cooperativeness of said user with a plurality of other users and updating said user behavior coefficient thereof in order to dynamically allocate said resource in a process with a high user satisfaction and a retention rate;
   implementing an exploration and exploitation as a function of a temperature parameter by said reinforcement learning algorithm; and
   determining an optimal value of said fairness coefficient and said throughput coefficient for successive iterations utilizing a probability function based on a selection index and said temperature parameter.

2. The method of claim 1 further comprising rendering a resource allocation decision based on an index value computed by a selection index function.

3. The method of claim 1 further comprising applying said fairness measurement based on a heterogeneous user demand.

4. The method of claim 1 further comprising adjusting said temperature parameter in accordance with an environment setting wherein a low temperature leads to a higher exploitation and a lower exploration, and a high temperature leads to a lower exploitation and a higher exploration.

5. The method of claim 1 further comprising:
randomly rendering a selection decision when said temperature parameter value is high so that a solution space is explored at said higher temperature parameter value; and
rendering a selection decision utilizing a greedy approach when said temperature parameter value is low.

6. The method of claim 1 further comprising considering said user behavior coefficient as a parameter for said resource allocation by iteratively interacting with said user in order to motivate said user to be more cooperative.

7. The method of claim 6 further comprising:
initiating a negotiation process by designating a value of a reduction factor in order to thereafter select a maximum number of users with a highest selection index value and a demand less than a total availability; and
considering a user with a low value of said user behavior coefficient as a greedy user that tends to be less flexible in said negotiation process and a user with a high value as a cooperative user that is more flexible in said negotiation process.

8. The method of claim 6 further comprising assigning said user behavior coefficient value to each user depending on said behavior in order to motivate said user to be more cooperative for efficiently allocating said resource.

9. The method of claim 1 wherein said cooperative user possesses a higher probability of selection in a future interaction as compared to said greedy user.

10. The method of claim 1 further comprising specifying a weight age for said fairness and said throughput based on a business requirement in order to thereafter determine an optimal value for said fairness weight age and said throughput weight age utilizing said reinforcement learning algorithm.

11. A system for dynamically allocating resources in a process, said system comprising:
a processor;
a data bus coupled to said processor; and
a computer-usable medium embodying computer code, said computer-usable medium being coupled to said data bus, said computer program code comprising instructions executable by said processor and configured for:
estimating a fairness coefficient and a throughput coefficient that respectively represent a significance of a fairness and a throughput utilizing a reinforcement learning algorithm in order to thereafter vary a degree of said fairness coefficient and said throughput coefficient while allocating a resource;
computing a user behavior coefficient with respect to a user to determine a degree of cooperativeness of said user with a plurality of other users and updating said user behavior coefficient thereof in order to dynamically allocate said resource in a process with a high user satisfaction and a retention rate;
implementing an exploration and exploitation as a function of a temperature parameter by said reinforcement learning algorithm; and
determining an optimal value of said fairness coefficient and said throughput coefficient for successive iterations utilizing a probability function based on a selection index and said temperature parameter.

12. The system of claim 11 wherein said instructions are further configured for rendering a resource allocation decision based on an index value computed by a selection index function.

13. The system of claim 11 wherein said instructions are further configured for applying said fairness measurement based on a heterogeneous user demand.

14. The system of claim 11 wherein said instructions are further configured for adjusting said temperature parameter in accordance with an environment setting wherein a low temperature leads to a higher exploitation and a lower exploration, and a high temperature leads to a lower exploitation and a higher exploration.

15. The system of claim 11 wherein said instructions are further configured for:
randomly rendering a selection decision when said temperature parameter value is high so that a solution space is explored at said higher temperature parameter value; and
rendering a selection decision utilizing a greedy approach when said temperature parameter value is low.

16. A non-transitory processor-readable medium storing code representing instructions to cause a process to perform a process to dynamically allocate resources in a process, said code comprising code to:
estimate a fairness coefficient and a throughput coefficient that respectively represent a significance of a fairness and a throughput utilizing a reinforcement learning algorithm in order to thereafter vary a degree of said fairness coefficient and said throughput coefficient while allocating a resource;
compute a user behavior coefficient with respect to a user to determine a degree of cooperativeness of said user with a plurality of other users and updating said user behavior coefficient thereof in order to dynamically allocate said resource in a process with a high user satisfaction and a retention rate;
implement an exploration and exploitation as a function of a temperature parameter by said reinforcement learning algorithm: and
determine an optimal value of said fairness coefficient and said throughput coefficient for successive iterations utilizing a probability function based on a selection index and said temperature parameter.

17. The non-transitory processor-readable medium of claim 16 wherein said code comprises code to render a resource allocation decision based on an index value computed by a selection index function.

* * * * *